Oct. 29, 1935.  R. M. WAPLES  2,019,031
GASKET AND PACKING MATERIAL FROM WHICH IT MAY BE MADE
Filed Dec. 19, 1934
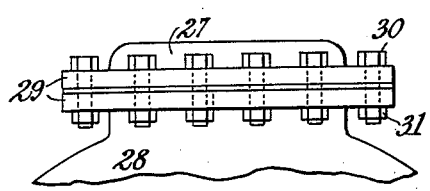
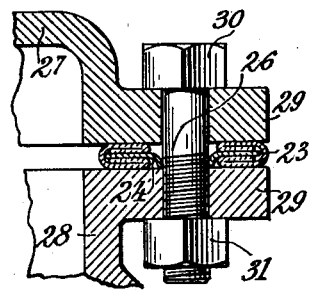
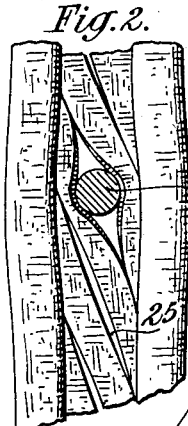
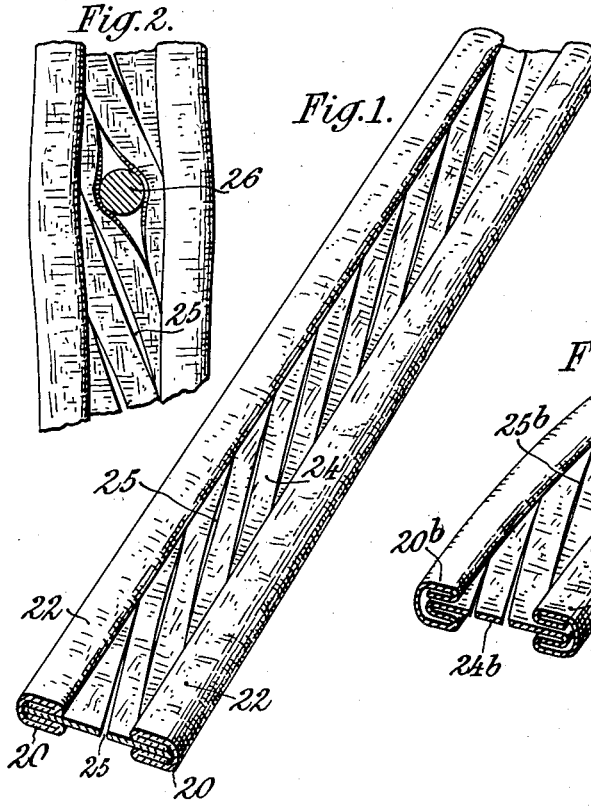
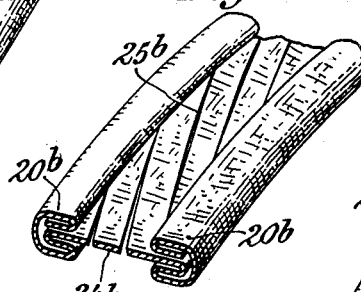
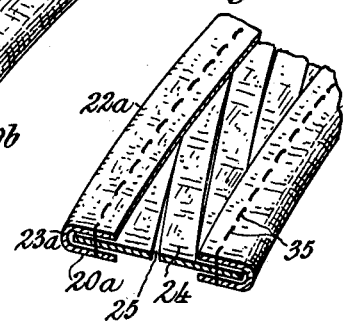
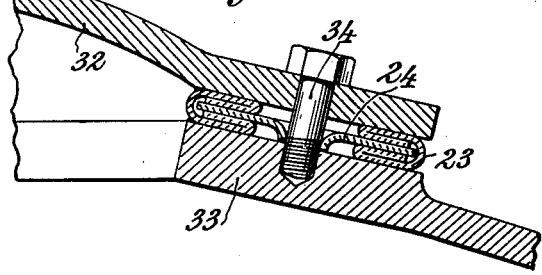
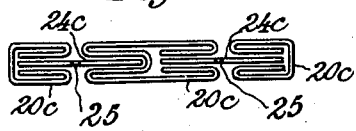
INVENTOR
Robert M. Waples,
BY Fraser, Myers & Manley,
ATTORNEYS.

Patented Oct. 29, 1935

2,019,031

UNITED STATES PATENT OFFICE 2,019,031

GASKET AND PACKING MATERIAL FROM WHICH IT MAY BE MADE

Robert M. Waples, Palmyra, N. Y., assignor to The Garlock Packing Company, Palmyra, N. Y., a corporation of New York Application December 19, 1934, Serial No. 758,219

2 Claims. (Cl. 154—45.5)

This invention relates to improvements in gaskets and packing material from which they may be made. The packing material and the gaskets, although adapted for general application in the packing of joints between parts of machine elements, are especially suitable as a means of sealing the joint about the cover of a locomotive smoke-box.

It is an object of the invention to provide gaskets and gasket material of the above-described character including packing elements which may be spaced at opposite sides of the fastening elements by which the parts of a device sealed by the gasket or gasket material are secured together without necessitating the perforation or cutting of the packing material and without even perforating or cutting any part of the gasket structure.

Gaskets embodying the invention may be manufactured in the form of rings of definite diameters or in the form of rectilinear strips of material adapted for use in the sealing of straight joints between parts of machine elements, or which may be bent into curved form if the degree of curvature is not too great, or the material may be manufactured in curved form and put up in helical coils from which portions may be cut for use as needed in the production of circular gaskets.

In the accompanying drawing illustrating the preferred and modified forms of the above-described invention,—

Figure 1 is a perspective view of a portion of a strip of gasket material such as might be used in the packing of straight joints or bent to curved form to produce gaskets having a sufficiently large radius of curvature to make the use of such packing material practicable.

Fig. 2 is a plan view of a part of a strip of gasket material like that illustrated by Fig. 1.

Fig. 3 is a side view of a portion of a pair of machine elements which might be representative of a manhole cover and adjacent parts, the joint between which is indicated as being sealed by a gasket embodying the invention.

Fig. 4 is a transverse, large-scale, sectional view of a part of the device illustrated by Fig. 3.

Fig. 5 is a transverse, cross-sectional view through a portion of a locomotive smoke-box cover and the part of a locomotive to which it is secured, the joint between the cover and adjacent parts being indicated as having been sealed by the use of a gasket embodying the invention.

Fig. 6 is a cross-sectional view through a strip of gasket material like that illustrated by Figs. 1 and 2, the parts being represented at the time of application of the folded marginal packing elements to the web of connecting material.

Fig. 7 is a perspective view of a fragmentary portion of a ring of gasket material embodying the invention in modified form.

Fig. 8 is a similar view of a fragmentary portion of a gasket ring embodying the invention in another modified form.

Fig. 9 is a cross-sectional view of a modified form of gasket material or gasket ring to which the principles of the invention may be applied.

As indicated by Figs. 1, 2 and 6, the invention may comprise a pair of strips 20 of packing material which may preferably have their marginal portions folded in as at 21, and the folded edge portions 22 of the strips may then be folded along their centers as at 23, the strips being connected with each other by a web of suitable material 24, the marginal portions of which may extend between the inwardly-directed folds of the strips 20, as best indicated by Figs. 1 and 6.

In order that gaskets made from the above-described material may be applied to machine elements with the packing strips 20 spaced at opposite sides of the fastening elements by which the parts to be sealed are secured together, without requiring that any part of the gasket structure be cut or perforated, the web 24 may be slitted at relatively closely spaced intervals, and preferably the slits 25 may be parallel with each other and diagonally disposed, as indicated in Figs. 1 and 2.

The web material 24 may comprise material such as thin fabric which will be sufficiently flexible and yielding to permit the portions between the slits 25 to be displaced to an extent such as to permit a fastening element 26 (Fig. 2) to be placed at any desired point lengthwise of the gasket material, and the slits in the web may be disposed at inclinations such as to form acute angles with the adjacent portions of the packing elements so as to permit portions of the packing elements to be readily spread at opposite sides of an inserted fastening element as indicated in Fig. 2 of the drawing.

In Figs. 3 and 4 is illustrated a pair of machine elements which might, for example, represent a manhole cover 27 and the part 28 of a machine to which the cover is to be attached, the joint between said parts being sealed by a gasket made from gasket material like that illustrated by Figs. 1, 2 and 6. The gasket is represented as being forcibly compressed between flanges 29 of the parts 27, 28 by means of fastening elements 26 comprising bolts 30 and nuts 31.

It will be apparent that the fastening elements 26, irrespective of their spacing, may be thrust through selected slits 25 in the gasket material and passed between the packing elements 20, 20, without cutting or piercing any part of the gasket construction.

In Fig. 5 are illustrated a cover 32 of a locomotive smoke-box and the adjacent portion 33 of the part of the locomotive to which it may be secured by bolts or other fastening devices 34, the joint between the cover and underlying portion of the structure being sealed by the use of gasket material like that illustrated by Figs. 1, 2 and 6.

In Fig. 7 is illustrated a modified form of the invention in which the packing elements 20a are merely folded inwardly along their centers as at 23a, the connecting web 24 being extended between the single folds 22a of the structure. The connecting web 24 may be identical with the one illustrated by Figs. 1, 2 and 6.

In Fig. 8 is illustrated another modified form of the invention in which the packing elements 20b and web 24b are represented as comprising parts of a single strip of material, the marginal portions of which are folded inwardly first along one side and then along the other side of the central portion which serves as the web. The central portion may be slitted as at 25b so that the web 24b will be an equivalent of the web 24 of the form of gasket material illustrated by Figs. 1 and 2.

In Fig. 9 is illustrated a modified form of the invention comprising three packing elements 20c spaced in side-by-side relation, each of which may comprise a folded structure, and such folded packing strips may be connected by intervening webs 24c having marginal portions extended between the folds of the packing strips as indicated.

The packing elements may be made of any suitable packing material, preferably rubber composition or its equivalent, or fibrous material, preferably asbestos fibre, which may be saturated or impregnated with rubber composition or its equivalent and vulcanized or otherwise treated.

The packing elements and the connecting web may be of the same or of different materials, and the web may be relatively thin as compared with the thickness of the packing elements, so that the strips of material between the slits may be readily displaced in order to pass a fastening element between the packing elements at a point which would normally be obstructed by a portion of the web.

The web and the packing elements may be firmly secured together either by making the entire structure of one strip of material as indicated in Fig. 8, or by the use of rubber cement and vulcanization, or by the use of any appropriate adhesive material; or the parts, whether or not secured together by vulcanization or the use of adhesives, may be secured by stitching as indicated at 35 in Fig. 7.

As has already been explained, the gasket material may be made up in rectilinear form for use in packing straight joints, or in packing curved joints of which the radius of curvature is not too small as compared with the width of the gasket material. If the dimensions of the parts to be sealed are such as to make it impracticable to bend rectilinear gasket material to circular form, the material may be manufactured in curved form as indicated by Figs. 7 and 8. Such curved material may be wound about a mandrel in the form of a helical spiral from which material may be cut as desired to form circular gaskets.

It is not essential that the spaced slits be exactly parallel with each other or that they be diagonally disposed, as distinguished from other crosswise-disposed slits, although the parallel diagonally-disposed slits would seem to be best adapted to serve the intended purpose.

The invention is not intended to be limited to the specific forms herein selected for purposes of illustration, but should be regarded as including modifications and variations thereof within the scope of the appended claims.

What is claimed is:—

1. Material adapted for use in the making of gaskets comprising two spaced strips of machinery packing disposed in a parallel, side-by-side relation, connected by intervening flexible material slitted diagonally at spaced intervals substantially from one packing element to the other, the slits being parallel and disposed at inclinations such as to form acute angles with the packing strips, and the spacing of the slits being relatively close to provide for the insertion of fastening elements between the packing elements and through selected slits at any desired points along the length of the material.

2. A gasket comprising a pair of concentric rings of packing material and an intervening annular series of closely-spaced, substantially parallel, diagonally-disposed strips of flexible connecting material, the strips being disposed at inclinations such as to form acute angles with adjacent portions of the packing rings and being relatively narrow to provide for the insertion of fastening elements between the packing elements and between selected strips at any desired points about the circumference of the gasket.

ROBERT M. WAPLES.